United States Patent
Watanabe et al.

(10) Patent No.: US 11,936,828 B1
(45) Date of Patent: Mar. 19, 2024

(54) APPLICATION DISTRIBUTION DEVICE DISTRIBUTES A PROGRAM FOR INSTALLING AN APPLICATION IN AN IMAGE FORMING APPARATUS AND NON-TRANSITORY RECORDING MEDIUM

(71) Applicant: Toshiba Tec Kabushiki Kaisha, Tokyo (JP)

(72) Inventors: Hiroshi Watanabe, Yokohama Kanagawa (JP); Jin Kamada, Izunokuni Shizuoka (JP); Hideaki Suzuki, Fuji Shizuoka (JP); Sho Sakuma, Sunto Shizuoka (JP); Tomoki Maeda, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/178,433

(22) Filed: Mar. 3, 2023

(51) Int. Cl.
    *H04N 1/00* (2006.01)
    *G06F 8/61* (2018.01)
    *G06F 11/36* (2006.01)

(52) U.S. Cl.
    CPC ........... *H04N 1/00938* (2013.01); *G06F 8/61* (2013.01); *G06F 11/3608* (2013.01); *H04N 1/00129* (2013.01); *H04N 1/00408* (2013.01); *H04N 1/0097* (2013.01); *H04N 1/00973* (2013.01); *G06F 2212/151* (2013.01); *H04N 2201/0094* (2013.01)

(58) Field of Classification Search
    None
    See application file for complete search history.

(56) References Cited

U.S. PATENT DOCUMENTS

| | | | |
|---|---|---|---|
| 6,498,611 B1 * | 12/2002 | Beard | G06F 9/451 |
| | | | 715/752 |
| 10,313,188 B2 | 6/2019 | Sun | |
| 2003/0084132 A1 * | 5/2003 | Ohta | G06F 9/4411 |
| | | | 713/1 |
| 2021/0092241 A1 | 3/2021 | Yoshida et al. | |
| 2022/0100439 A1 * | 3/2022 | Satyamohan | G06F 3/1224 |

FOREIGN PATENT DOCUMENTS

JP     2017-191512 A     10/2017

* cited by examiner

*Primary Examiner* — Haris Sabah
(74) *Attorney, Agent, or Firm* — FOLEY & LARDNER LLP (57) ABSTRACT

An application distribution device includes one or more processors and one or more memory devices storing instructions. The instructions cause the processors to obtain a virtual image forming apparatus that emulates a physical image forming apparatus; determine whether an application launched in the virtual image forming apparatus corresponds to an application installed in the physical image forming apparatus; based on the determination, acquire setting information of the application launched in the virtual image forming apparatus, the setting information comprising a setting made for the application launched in the virtual image forming apparatus; obtain an updated application by updating the application based on the acquired setting information; and distribute a program to the physical image forming apparatus, the program comprising instructions executable by the physical image forming apparatus and configured to implement the updated application in the physical image forming apparatus, the updated application based on the acquired setting information.

20 Claims, 6 Drawing Sheets

| SETTING INFORMATION ID | APP ID | SETTING DATE AND TIME | SETTING ITEM 1 | SETTING ITEM 2 | ... |
|---|---|---|---|---|---|
| 0001 | A-100 | 2022-01-10T10:45+09:00 | /SharedServer/Foo | ... | ... |
| ... | ... | ... | ... | ... | ... |

FIG. 3

| SETTING INFORMATION ID | MFP SERIAL NUMBER 1 | MFP SERIAL NUMBER 2 | ... |
|---|---|---|---|
| 0001 | M-100000 | M-111111 | ... |
| ... | ... | ... | ... |

FIG. 4

| APP ID | INSTALLATION PROGRAM |
|---|---|
| A-100 | apro |
| B-502 | bpro |
| C-002 | cpro |
| ... | ... |

FIG. 5

| APP ID | APP NAME | VERSION |
|---|---|---|
| A-100 | AppABC | V1.0 |
| B-502 | AppEFG | V2.3 |
| C-002 | AppXYZ | V1.4 |
| ... | ... | ... |

APPLICATION DISTRIBUTION DEVICE DISTRIBUTES A PROGRAM FOR INSTALLING AN APPLICATION IN AN IMAGE FORMING APPARATUS AND NON-TRANSITORY RECORDING MEDIUM

FIELD

Embodiments described herein relate generally to an application distribution device and a non-transitory computer readable medium (e.g., a non-transitory recording medium).

BACKGROUND

Various settings can be made for an application to be installed in an image forming apparatus. Setting contents generally differ depending on environment of the image forming apparatus, such as a specification of the image forming apparatus and an application of a user.

There is a technique in which an application is installed together with setting information in which setting contents are recorded in advance, and the setting contents are reflected in the installed application. In this case, there is a problem that whether the setting contents are appropriate cannot be known until the image forming apparatus is actually operated.

A technique that can automatically make an appropriate setting for the application installed in the image forming apparatus is provided. In other words, provided herein are systems and methods for automatically determining and implementing a setting profile in an application installed within an image forming apparatus.

DETAILED DESCRIPTION

An application distribution device according to an embodiment includes one or more processors and one or more memory devices. The one or more memory devices (i.e., memory) includes an emulation unit (e.g., emulation module, emulation manager, emulator, etc.), an acquisition unit (e.g., acquisition module, acquisition manager, etc.), and a distribution unit (e.g., distribution module, distribution manager, etc.), according to some embodiments. The emulation unit implements a virtual image forming apparatus (e.g., a digital copy, a virtual twin, a digital couple) that emulates an image forming apparatus (e.g., printer, scanner, camera, etc.). For example, the emulation unit may store and provides a virtual model for use in a software testing environment, manages virtual models of an image forming apparatus, imitates an image forming apparatus, mimics an image forming apparatus. The acquisition unit acquires setting information (e.g., setting values, setting parameters, setting criteria, setpoint values, setting profiles, etc.) for reflecting (e.g., propagating, distributing, applying, transferring, etc.) a setting made to an application (e.g., computer readable code, computer instructions, computer algorithms, computer readable medium, software, firmware, etc.) launched in the virtual image forming apparatus, and, if the application is installed in an actual (physical) image forming apparatus, updates the setting information of an application to be installed on one or more actual image forming apparatus. The distribution unit distributes a program (e.g., software, computer executable instructions, a computer algorithm, etc.) for installing the application in the actual image forming apparatus and the acquired setting information to the actual image forming apparatus.

Figure 1:
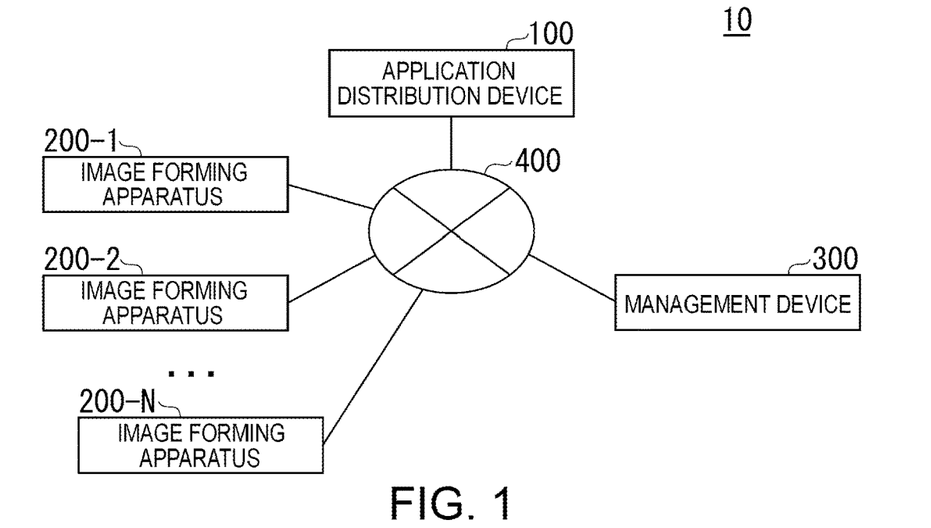
FIG. 1 is a diagram illustrating an application distribution system, according to some embodiments.

FIG. 1 is a diagram illustrating an example of an overall configuration of an application distribution system 10, according to some embodiments. The application distribution system 10 includes an application distribution device 100, multiple image forming apparatuses 200-1, 200-2, and 200-N(N is a positive integer representing a large or infinite number of image forming apparatus 200), a management device 300, and a network 400. In the following description, the image forming apparatuses 200-1, 200-2, and 200-N are referred to as an image forming apparatus 200 if the image forming apparatuses 200-1, 200-2, and 200-N are not distinguished from each other. In other words, in the following description, unless indicated otherwise, the image forming apparatus 200 is one or more of the image forming apparatuses 200-1, 200-2, 200-N. The application distribution device 100, the image forming apparatus 200, and the management device 300 can communicate with each other via the communications network 400 (e.g., wireless network, cellular network, local area network, wireless local area network, wide area network, local communications network, virtual private network, etc.).

The application distribution device 100 distributes a program (hereinafter referred to as an "installation program") for installing an application in the image forming apparatus 200. The application distribution device 100 can also distribute setting information to be reflected if the application is installed in the image forming apparatus 200.

The application distribution device 100 can implement the virtual image forming apparatus that emulates the image forming apparatus. In the following description, if it is simply described as the "image forming apparatus", this indicates the actual image forming apparatus unless otherwise specified. On the other hand, if it is simply described as the "virtual image forming apparatus", this indicates the image forming apparatus emulated in the application distribution device 100. Also, the application may be expressed as an "app".

The management device 300 may be a host device (e.g., computing system, computer, servers, host computing system, a microcontroller, a processor, a computing device, etc.), according to some embodiments. The management device 300 is, for example, a personal computer (PC) operated by an administrator who manages the image forming apparatus 200, and includes a display device (e.g., a display configured to present a graphical user interface, a light emitting device, a light emitting diode display, a backlit display, an electrophoretic display, etc.) and an input device (e.g., buttons, keyboard, mouse, touch sensitive surface, etc.). The management device 300 can display a setting screen for the application launched in the virtual image forming apparatus. The user (e.g., administrator) sets the application on the setting screen displayed on the management device 300 (e.g., navigates the graphical user interface and configures the setting information for the application launched in the virtual image forming apparatus). Setting information indicating setting contents is stored in the application distribution device 100. The application includes a Web setting compatible app that can be set using a Web browser of another device such as a PC. The management device 300 can also set the Web setting compatible app. In this case as well, the setting information is stored in the application distribution device 100, according to some embodiments.

Figure 2:
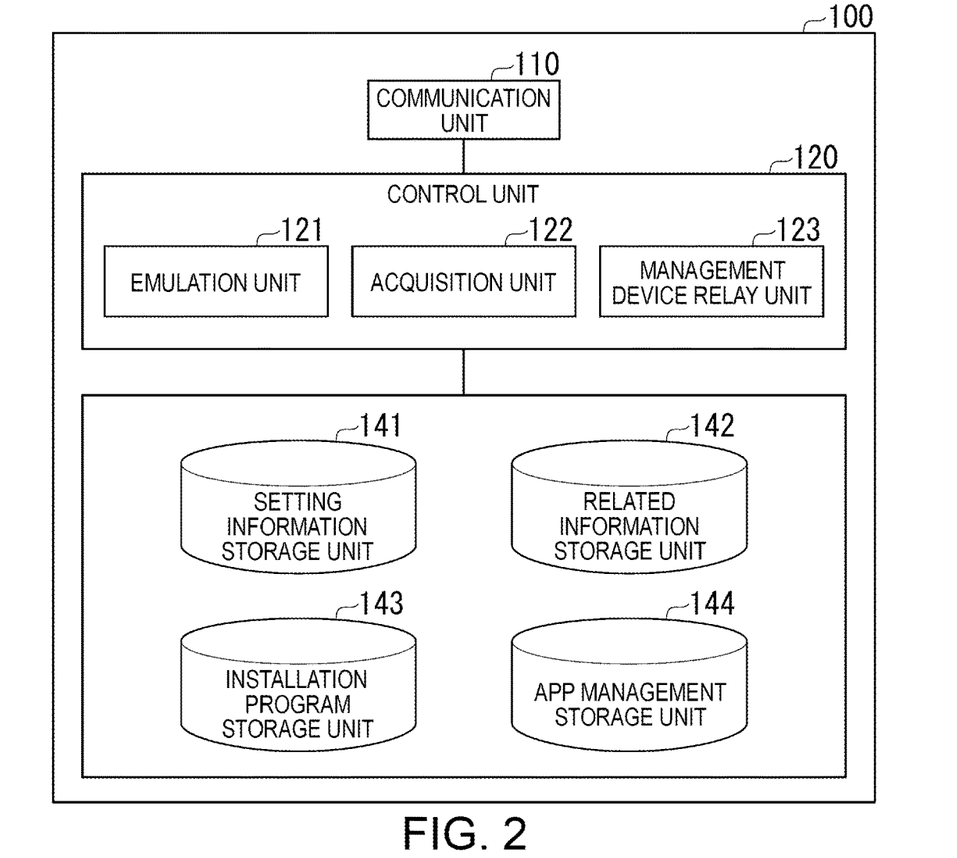
FIG. 2 is a block diagram illustrating an application distribution device, according to some embodiments.

FIG. 2 is a block diagram illustrating a functional configuration of the application distribution device 100. The application distribution device 100 includes one or more processing units (e.g., one or more central processing units (CPU), etc.), one or more memory devices, an auxiliary storage device, and the like connected by a bus. The application distribution device 100 functions as a device including a communication unit 110 (e.g., communications module, communications manager, etc.), a setting information storage unit 141 (e.g., setting information database), a related information storage unit 142 (e.g., related information database), an installation program storage unit 143 (e.g., installation program database), an app management storage unit 144 (e.g., app management database), and a control unit 120 by executing an app distribution program for executing processing (e.g., instructions for the one or more processors) related to application distribution. All or part of functions of the communication unit 110, the setting information storage unit 141, the related information storage unit 142, the installation program storage unit 143, the app management storage unit 144, and the control unit 120 may be implemented using hardware such as an application specific integrated circuit (ASIC), a programmable logic device (PLD), or a field programmable gate array (FPGA). The app distribution program may be recorded on a computer-readable recording medium. The computer-readable recording medium includes a portable media such as a flexible disk, a magneto-optical disk, a ROM, and a CD-ROM, and a storage device such as a hard disk incorporated in a computer system. The app distribution program may be transmitted via a telecommunication line.

In some embodiments, the communication unit 110 is a network interface. The communication unit 110 communicates with the image forming apparatus 200 and the management device 300 via the network 400.

Figure 3:
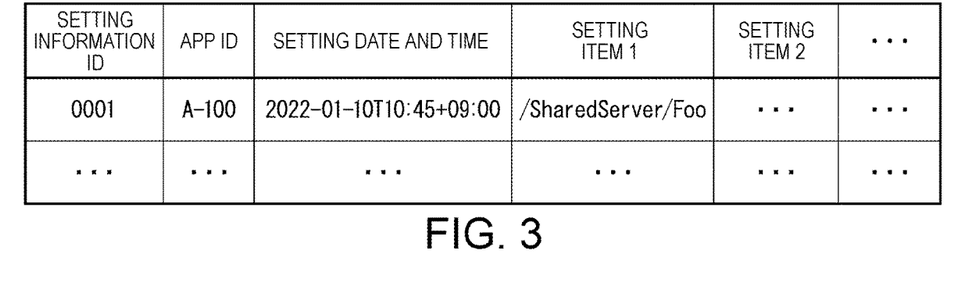
FIG. 3 is a diagram illustrating a setting information database, according to some embodiments.

In some embodiments, the setting information storage unit 141 is configured using a storage device such as a magnetic hard disk device or a semiconductor storage device. The setting information storage unit 141 stores a setting information database. FIG. 3 is a diagram illustrating a specific example of the setting information database. The setting information database includes a setting information ID, an app ID, a setting date and time, and one or more setting items.

The setting information ID is an identifier for uniquely identifying the setting information. The app ID is an identifier for uniquely identifying an application to which the setting information is applied. The setting date and time is the date and time when the setting is performed. The setting item indicates a specific setting content, and one or more setting items are provided according to the application. For example, if there are N setting items, setting items 1, 2, . . . , N are provided. In addition, the description content of the setting item 1 illustrated in FIG. 3 is "/SharedServer/ Foo", which indicates a connection destination (file server). A collection of the setting items becomes the setting information.

The setting item may be a combination of, for example, information indicating the setting item and the setting content. For example, a tag may be used as an item name in XML, and the setting contents may be described so as to be interposed between the tags. Also, as the setting item, the time (for example, date and time) for installing the application may be provided. In this case, the administrator inputs the time in the management device 300, and the application distribution device 100 acquires the input time.

Figure 4:
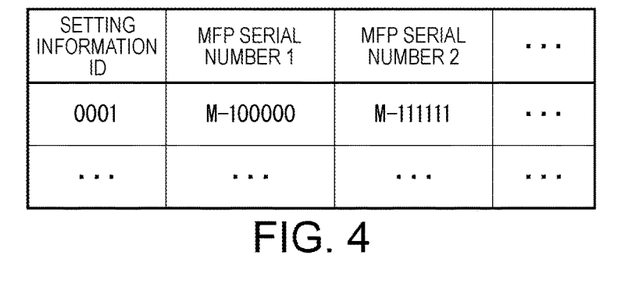
FIG. 4 is a diagram illustrating a related information database, according to some embodiments.

The related information storage unit 142 is configured using a storage device such as a magnetic hard disk device or a semiconductor storage device. The related information storage unit 142 stores a related information database. FIG. 4 is a diagram illustrating a specific example of the related information database. The related information database includes a setting information ID and one or more MFP serial numbers.

The related information storage unit 142 is a database that correlates the setting information with identification information for identifying the image forming apparatus that reflects the setting information. Specifically, the related information database indicates the MFP serial number of the image forming apparatus to which the setting information identified by the setting information ID can be applied. The MFP serial number is the identification information for uniquely identifying the image forming apparatus. As illustrated in FIG. 4, one piece of setting information can be correlated with a plurality of MFP serial numbers. For example, setting information of a setting information ID 0001 can be applied to an image forming apparatus with an MFP serial number of M-100000 and an image forming apparatus with an MFP serial number of M-111111.

Figure 5:
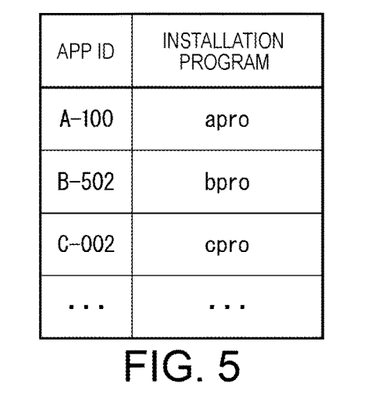
FIG. 5 is a diagram illustrating an installation program database, according to some embodiments.

The installation program storage unit 143 is configured using a storage device such as a magnetic hard disk device or a semiconductor storage device. The installation program storage unit 143 stores an installation program database. FIG. 5 is a diagram illustrating a specific example of the installation program database. The installation program database includes an app ID and an installation program. The installation program is an executable file for installing the application. For example, an installation program for an application with an app ID of A-100 is apro.

Figure 6:
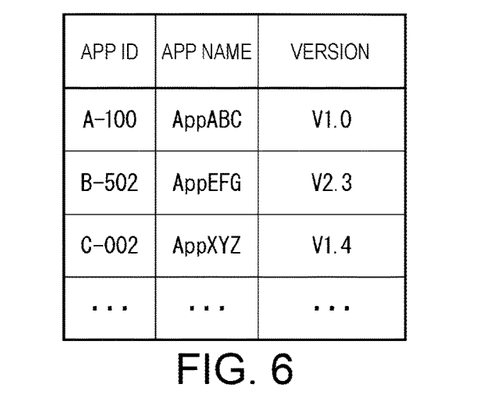
FIG. 6 is a diagram illustrating an app management database, according to some embodiments.

The app management storage unit 144 is configured using a storage device such as a magnetic hard disk device or a semiconductor storage device. The app management storage unit 144 stores an app management database. FIG. 6 is a diagram illustrating a specific example of the app management database. The app management database includes an app ID, an app name, and a version. The app name is a name of an application corresponding to the app ID. The version is a version of the application corresponding to the app ID.

In FIG. 2, the control unit 120 is configured with an emulation unit 121, an acquisition unit 122, and a management device relay unit 123. The emulation unit 121 implements the virtual image forming apparatus that emulates the image forming apparatus in the application distribution device 100. The acquisition unit 122 acquires setting information for reflecting a setting made to the application launched in the virtual image forming apparatus if the application is installed in the image forming apparatus 200.

The management device relay unit 123 performs relaying between the management device 300 and the emulation unit 121. Specifically, the management device relay unit 123 relays to the management device 300 the setting screen of the application launched in the virtual image forming apparatus implemented by the emulation unit 121. In addition, the management device relay unit 123 relays to the emulation unit 121 an operation content operated by the administrator on the setting screen displayed on the management device 300.

Figure 7:
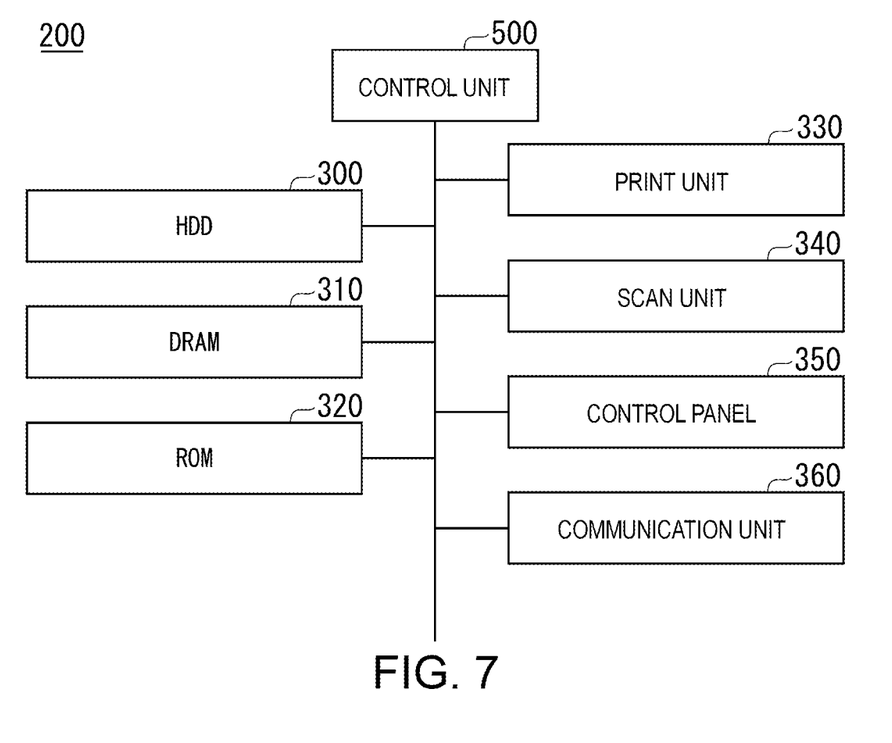
FIG. 7 is a diagram illustrating a control system of the image forming apparatus of FIG. 2, according to some embodiments.

Next, a configuration of the image forming apparatus 200 will be described. FIG. 7 is a diagram illustrating a configuration of a control system of the image forming apparatus 200. The image forming apparatus 200 includes a print unit 330 (e.g., printer), a scan unit 340 (e.g., scanner), a control panel 350, a communication unit 360, a control unit 500, a hard disk drive (HDD) 300, a dynamic random access memory (DRAM) 310, and a read only memory (ROM) 320. These units are connected to each other via a system bus.

The control unit 500 controls each unit connected via the system bus. The ROM 320 stores various control programs necessary for image forming apparatus 200 to operate. The ROM 320 stores programs for controlling image forming operations and the like. Each program and each piece of data are stored in the HDD 300. Execution of each program stored in the ROM 320 and the HDD 300 is controlled by the control unit 500. The DRAM 310 is a buffer memory that temporarily stores data generated during execution of each program. The communication unit 360 communicates with the application distribution device 100 via the network 400.

Figure 8:
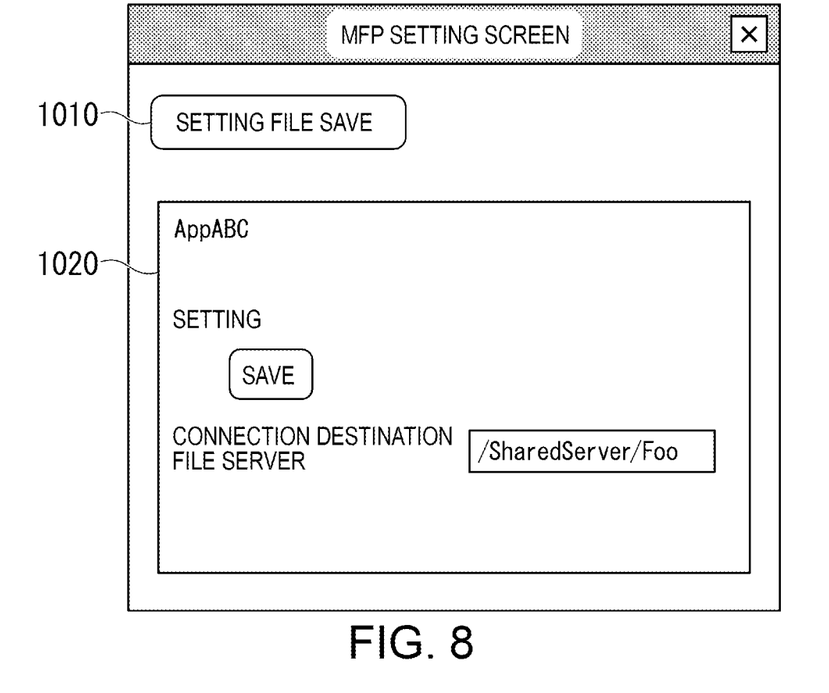
FIG. 8 is a diagram illustrating a graphical user interface including a setting screen.

Next, an example of a screen displayed on the management device 300 will be described. FIG. 8 is a diagram illustrating an example of a setting screen of an application (AppABC) launched in the virtual image forming apparatus displayed on the management device 300. As illustrated in FIG. 8, the setting screen includes a save button 1010 and a setting input field 1020. In FIGS. 8-11, the boxes having rounded corners illustrate user interactive virtual fields (e.g., virtual buttons) configured to detect a user interaction or selection. For example, a user may provide an input corresponding to a selection of the "DELETE" button shown in FIG. 9 and subsequently the data system may delete or discard data corresponding to the example information illustrated in the screen of the graphical user interface. The graphical user interfaces illustrated in FIGS. 8-11 may include one or more user interactive fields such as radio buttons, user input fields (e.g., text input), dropdown menus, etc.

In FIG. 8, the save button 1010 is a button for saving a setting content input to the setting input field 1020. If the save button 1010 is selected, the setting content is stored in the setting information storage unit 141 as the setting information. The setting input field 1020 illustrates, as an example, a screen for setting a connection destination file server. The setting input field 1020 has a "save" button, but the "save" button is a button for saving the setting content, and is different from a button for storing the setting content as the setting information.

Figure 9:
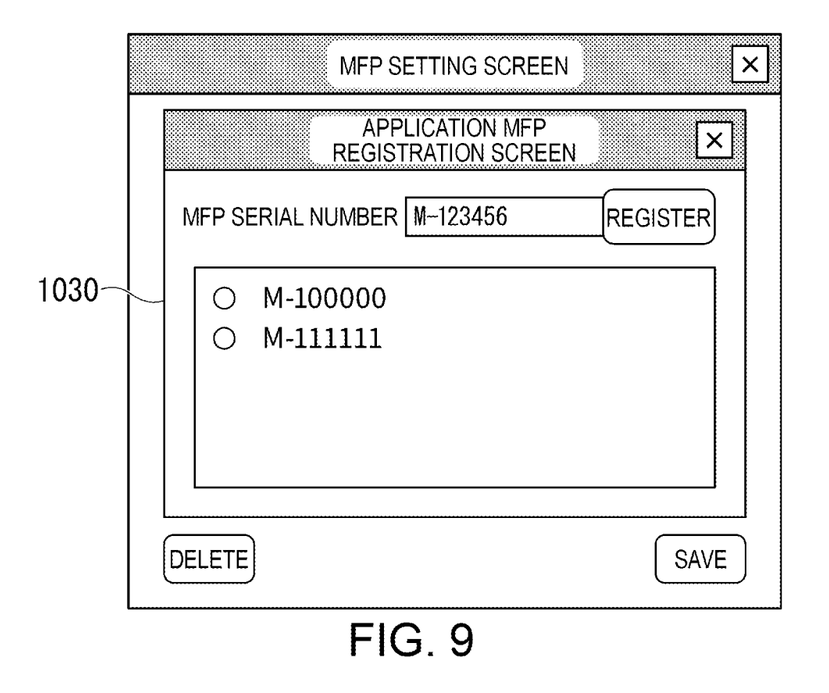
FIG. 9 is a diagram illustrating an application multifunction printer (MFP) registration screen.

FIG. 9 is a diagram illustrating an application MFP registration screen 1030 for registering an MFP serial number of the image forming apparatus to which the setting information can be applied. The application MFP registration screen 1030 includes an input field for the MFP serial number and a registration list for displaying the currently registered MFP serial numbers. If the administrator inputs the MFP serial number to the input field and selects a registration button, the MFP serial number is displayed in the registration list. For example, if the registration button is selected with M-123456 input, the M-123456 is added to the registration list.

On the other hand, to delete the MFP serial number displayed in the registration list, the administrator selects a radio button next to the MFP serial number and selects a delete button. As a result, the MFP serial number is deleted from the registration list. If the administrator selects the save button, the MFP serial number of the registration list is stored in the related information storage unit 142.

Figure 10:
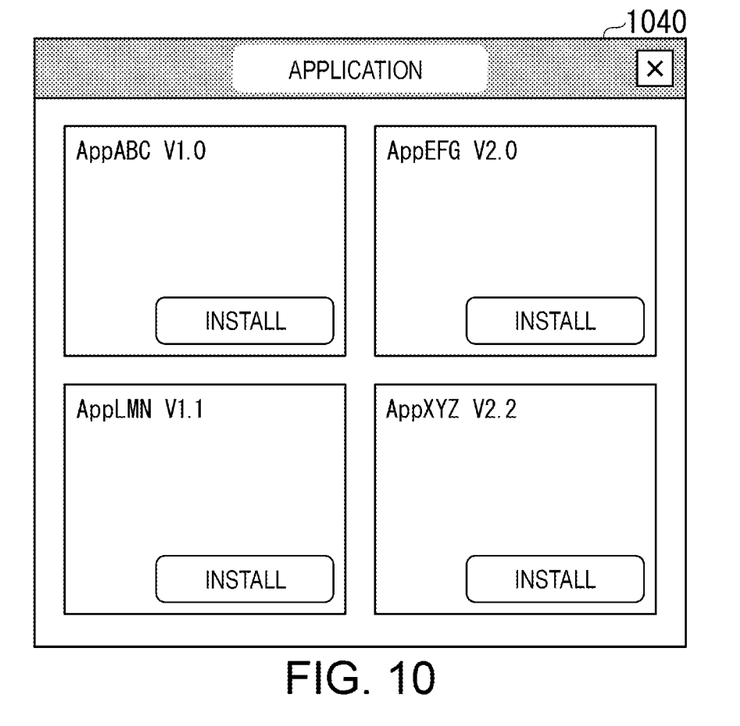
FIG. 10 is a diagram illustrating a list screen of a graphical user interface of a control panel, according to some embodiments.

Next, an example of a screen displayed on the image forming apparatus 200 will be described. FIG. 10 is a diagram illustrating a list screen 1040 displayed on the control panel 350 of the image forming apparatus 200. The image forming apparatus 200 displays a list of applications that can be installed in the image forming apparatus 200, as illustrated in the list screen 1040.

Figure 11:
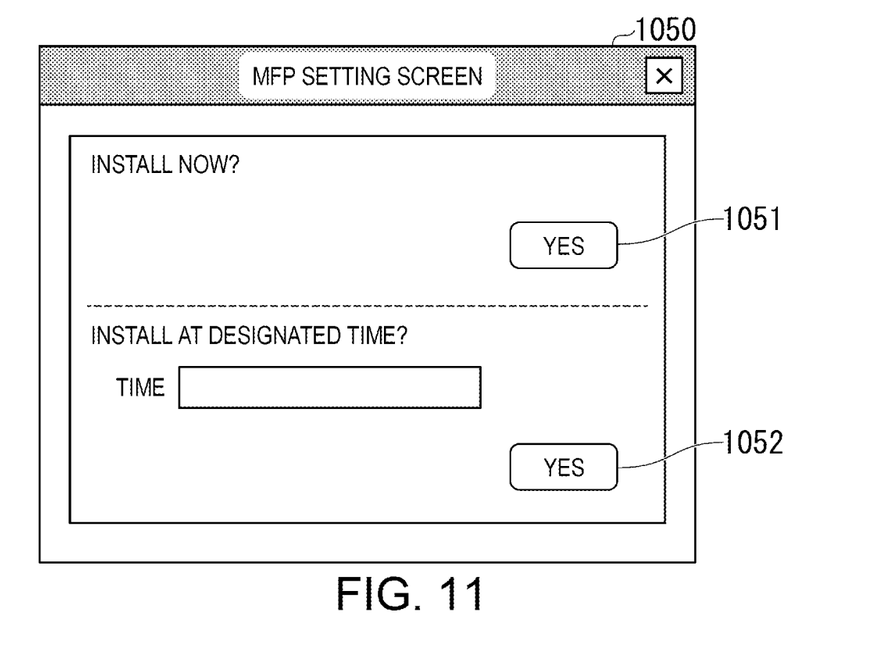
FIG. 11 is a diagram illustrating an installation time setting screen of a graphical user interface, according to some embodiments.

The example of the list screen 1040 illustrates that four applications (AppABC, AppEFG, AppLMN, and AppXYZ) are installable. If a user of the image forming apparatus 200 selects an install button corresponding to the application to be installed, an installation time setting screen is displayed.

FIG. 11 is a diagram illustrating an installation time setting screen 1050. As illustrated in the installation time setting screen 1050, the user can set whether to install the application immediately or to install the application at the designated time. If a button 1051 is selected by the user, the image forming apparatus 200 immediately starts downloading and installs the application. In this case, the setting is reflected in the application by the setting information. On the other hand, if a button 1052 is selected by the user, the image forming apparatus 200 starts downloading at the designated time and installs the application. In this case as well, the setting is reflected in the application by the setting information.

For example, the user can use the installed application during a next time period when the image forming apparatus 200 is used (for example, business hours) by designating a time period (for example, midnight) when the image forming apparatus 200 is not used as the time.

Figure 12:
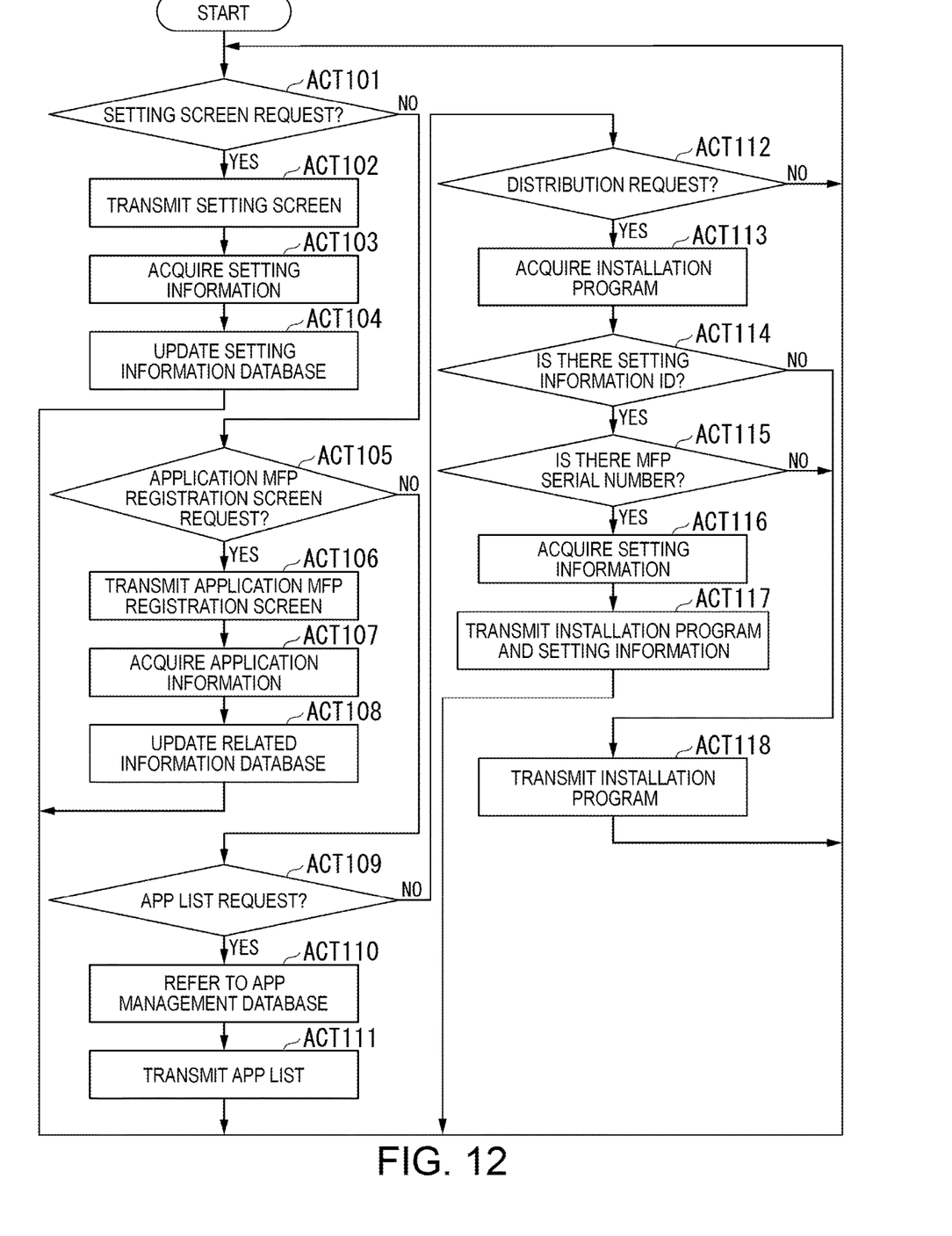
FIG. 12 is a flowchart illustrating a logic of the application distribution device of FIG. 1, according to some embodiments.

Next, processing flow of the application distribution device 100 will be described. FIG. 12 is a flowchart illustrating the processing flow of the application distribution device 100. The flowchart illustrates processing flow in a state where the virtual image forming apparatus is already started (e.g., loaded, booted, inserted into the testing environment).

The application distribution device 100 determines whether a setting screen request for requesting the setting screen (see FIG. 8) is received from the management device 300 (ACT 101). Upon receiving the setting screen request (ACT 101: YES), the application distribution device 100 transmits the setting screen (ACT 102). Here, "transmits the setting screen" means transmitting information for displaying the requested setting screen to an application installed in the management device 300, for example.

The application distribution device 100 acquires setting information according to the content set on the setting screen displayed on the management device 300 (ACT 103). The application distribution device 100 updates the setting information database with the acquired setting information (ACT 104), and returns to ACT 101.

In ACT 101, if the setting screen request is not received (ACT 101: NO), the application distribution device 100 determines whether an application MFP registration screen request for requesting the application MFP registration screen (see FIG. 9) is received from the management device 300 (ACT 105). Upon receiving the application MFP registration screen request (ACT 105: YES), the application distribution device 100 transmits the application MFP registration screen (ACT 106). Here, "transmits the application MFP registration screen" means transmitting information for displaying the requested application MFP registration screen to the application installed in the management device 300, for example.

The application distribution device 100 acquires application information according to the content registered or deleted on the application MFP registration screen displayed on the management device 300 (ACT 107). The application distribution device 100 updates the related information database with the acquired application information (ACT 108), and returns to ACT 101.

In ACT 105, if the application MFP registration screen request is not received (ACT 105: NO), the application distribution device 100 determines whether an app list request is received from the image forming apparatus 200 (ACT 109). This app list request is a request for a list of applications that can be installed by the image forming apparatus 200 so that the image forming apparatus 200 can display the list screen (see FIG. 10).

If the app list request is received (ACT 109: YES), the application distribution device 100 refers to the application management database (ACT 110), and the app list including at least the app ID and the app name is transmitted to the image forming apparatus 200 (ACT 111), and returns to ACT 101.

In ACT 109, if the app list request is not received (ACT 109: NO), the application distribution device 100 determines whether a distribution request is received from the image forming apparatus 200 (ACT 112). This distribution request is a request for the installation program of the application of which the install button is selected on the list screen (see FIG. 10) displayed by the image forming apparatus 200. In the distribution request, the application distribution device 100 is notified of the MFP serial number of the image forming apparatus 200 as a request source and the app ID. In ACT 112, if the distribution request is not received (ACT 112: NO), the application distribution device 100 returns to ACT 101.

If the distribution request is received (ACT 112: YES), the application distribution device 100 acquires the installation program corresponding to the notified app ID from the installation program database. Further, the application distribution device 100 refers to the setting information database and determines whether there is a setting information ID having the notified app ID (ACT 114). If there is no setting information ID (ACT 114: NO), the application distribution device 100 transmits the installation program to the image forming apparatus 200 (ACT 118), and returns to ACT 101.

If there is the setting information ID having the notified app ID (ACT 114: YES), the application distribution device 100 refers to the setting information database and determines whether there is the notified MFP serial number in the record corresponding to the setting information ID (ACT 115). If there is no notified MFP serial number in the record corresponding to the setting information ID (ACT 115: NO), the application distribution device 100 transmits only the installation program to the image forming apparatus 200 as a request source (ACT 118), and returns to ACT 101.

If there is the notified MFP serial number in the record corresponding to the setting information ID (ACT 115: YES), the application distribution device 100 acquires the setting information from the setting information database (ACT 116). The application distribution device 100 transmits the installation program and setting information to the image forming apparatus 200 as a request source (ACT 117), and returns to ACT 101.

As described above, according to the application distribution device 100 according to the present embodiment, it is possible to automatically make appropriate settings for applications installed in the image forming apparatus.

Furthermore, in the present embodiment, since settings are made on the setting screen of the virtual image forming apparatus, the virtual image forming apparatus can be operated with the settings. Although the virtual image forming apparatus does not have a real scanner engine or printer engine, for example, image data is input to the application distribution device 100, and the input image data is handled by the virtual image forming apparatus as image data obtained by scanning. Then, for example, a reading area in the scanned image is set. The virtual image forming apparatus displays a region when reading in the set reading area. In an image forming apparatus of the related art, it is not possible to know whether the setting contents are appropriate until the image forming apparatus is actually operated. According to the present embodiment, it is possible to confirm whether the setting contents are appropriate without operating the actual image forming apparatus.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An application distribution device comprising:
one or more processors; and
one or more memory devices storing instructions thereon that when executed by the one or more processors cause the one or more processors to:
obtain a virtual image forming apparatus that emulates a physical image forming apparatus;
determine whether an application launched in the virtual image forming apparatus corresponds to an application installed in the physical image forming apparatus;
based on the determination, acquire setting information of the application launched in the virtual image forming apparatus, the setting information comprising a setting made for the application launched in the virtual image forming apparatus;
obtain an updated application by updating the application based on the acquired setting information; and
distribute a program to the physical image forming apparatus, the program comprising instructions executable by the physical image forming apparatus and configured to implement the updated application in the physical image forming apparatus, the updated application based on the acquired setting information.

2. The application distribution device of claim 1, wherein the setting information is stored in a database and associated with identification information for identifying the physical image forming apparatus.

3. The application distribution device of claim 2, wherein at least a portion of the setting information is correlated with a plurality of the identification information.

4. The application distribution device of claim 1, wherein the instructions cause the one or more processors to:
  present, via a display, a graphical user interface including a setting screen of an application launched in the virtual image forming apparatus;
  wherein the setting information of the application launched in the virtual image forming apparatus is based on a setting made via the setting screen displayed on the display.

5. The application distribution device of claim 4, wherein the display is a display of a host device.

6. The application distribution device of claim 1, wherein the instructions cause the one or more processors to:
  receive, via a user interface, an input regarding a time to install the application in the physical image forming apparatus.

7. The application distribution device of claim 1, wherein the physical image forming apparatus comprises a printer, a scanner, and a control panel.

8. The application distribution device of claim 1, wherein the physical image forming apparatus is configured to communicably connect with the display, and the user interface, via a network.

9. A non-transitory computer-readable medium having computer-executable instructions stored therein, the instructions when executed by a processor cause the processor to perform operations comprising:
  obtaining a virtual image forming apparatus that emulates a physical image forming apparatus;
  determining whether an application launched in the virtual image forming apparatus corresponds to an application installed in the physical image forming apparatus;
  acquiring, based on the determination, setting information of the application launched in the virtual image forming apparatus, the setting information comprising a setting made for the application launched in the virtual image forming apparatus;
  obtain an updated application by updating the application based on the acquired setting information; and
  distribute a program to the physical image forming apparatus, the program comprising instructions executable by the physical image forming apparatus and configured to implement the updated application in the physical image forming apparatus, the updated application based on the acquired setting information.

10. The non-transitory computer-readable medium of claim 9, wherein the operations comprise:
  storing the setting information in a database, the setting information associated with identification information for identifying the physical image forming apparatus.

11. The non-transitory computer-readable medium of claim 10, wherein the operations comprise:
  correlating at least a portion of the setting information with a plurality of the identification information.

12. The non-transitory computer-readable medium of claim 9, wherein the operations comprise:
  presenting, via a display, a graphical user interface including a setting screen of an application launched in the virtual image forming apparatus;
  wherein the setting information of the application launched in the virtual image forming apparatus is based on a setting made via the setting screen displayed on the display.

13. The non-transitory computer-readable medium of claim 9, wherein the operations comprise:
  receive, via a user interface, an input regarding a time to install the application in the physical image forming apparatus.

14. An application distribution system comprising:
  a physical image forming apparatus;
  an application distribution device comprising a memory storing instructions thereon and a processor configured to execute the instructions to:
    obtain a virtual model of the physical image forming apparatus, the virtual model emulating the physical image forming apparatus;
    determine whether an application launched in the virtual model corresponds to an application installed in the physical image forming apparatus;
    based on the determination, acquire setting information of the application launched in the virtual model, the setting information comprising a setting made for the application launched in the virtual model;
    obtain an updated application by updating the application based on the acquired setting information; and
    distribute a program to the physical image forming apparatus, the program comprising instructions executable by the physical image forming apparatus and configured to implement the updated application in the physical image forming apparatus, the updated application based on the acquired setting information.

15. The application distribution system of claim 14, wherein the setting information is stored in a database and associated with identification information for identifying the physical image forming apparatus.

16. The application distribution system of claim 15, wherein at least a portion of the setting information is correlated with a plurality of the identification information.

17. The application distribution system of claim 14, wherein the instructions cause the processor to:
  present, via a display, a graphical user interface including a setting screen of an application launched in the virtual model;
  wherein the setting information of the application launched in the virtual model is based on a setting made via the setting screen displayed on the display.

18. The application distribution system of claim 14, wherein the instructions cause the processor to:
  receive, via a user interface, an input regarding a time to install the application in the physical image forming apparatus.

19. The application distribution device of claim 14, wherein the physical image forming apparatus comprises a printer, a scanner, and a control panel.

20. The application distribution device of claim 14, wherein the physical image forming apparatus is configured to communicably connect with the display, the user interface, and the distribution device, via a network.

* * * * *